United States Patent Office 3,642,633
Patented Feb. 15, 1972

3,642,633
LUBRICANT COMPOSITIONS
Rudolf J. A. Eckert and Johannes M. Wortel, Amsterdam, Netherlands, assignors to Shell Oil Company, New York, N.Y.
No Drawing. Filed Dec. 31, 1969, Ser. No. 889,704
Claims priority, application Great Britain, Jan. 1, 1969, 26/69
Int. Cl. C10m 1/28, 1/34
U.S. Cl. 252—57                                        4 Claims

ABSTRACT OF THE DISCLOSURE

Lubricant composition containing copolymers having free hydroxyl groups and derived from a compound comprising a single polymerizable C=C group and at least one aromatic ring which is incorporated into the monomer mixture from which the copolymers are polymerized have improved pour points, viscosity indices and dispersant properties.

BACKGROUND OF THE INVENTION

This invention relates to improved lubricant compositions and to novel copolymers having free hydroxyl groups contained therein.

The suitability of a lubricating oil for use in internal combustion engines is determined to a high degree by the pour point, the viscosimetric behaviour and the dispersive power of the oil.

Depending on the base material selected and the preparative route followed, lubricating oils may contain considerable quantities of wax. This wax separates out if the lubricating oil is cooled below a certain temperature. On further cooling more wax will separate out until finally the mixture of wax and oil hardly flows any longer, if at all. The lowest temperature observed in a standard laboratory test at which the waxy mixture still flows is called the pour point. In order to prevent the occurrence of difficulties during use of the lubricating oil the pour point of the oil should be below the lowest temperature at which the oil is used. It is customary to add to lubricating oils whose pour point is too high polymers which are capable of depressing the pour point of the oil.

The relationship between the viscosity and the temperature of a lubricating oil is expressed as the viscosity index (VI). The more the viscosity of a lubricating oil is dependent on the temperature, the lower is the VI of the oil. For lubricating oils whose viscosity is highly temperature-dependent, it is customary to add polymers as VI improvers. This has the effect of diminishing such dependence. The principle underlying the action of these VI improvers resides in the fact that these compounds are capable of bringing about a thickening effect which is relatively greater at high than at low temperatures. Sometimes, however, the viscosity of a lubricating oil depends only slightly on the temperature, but the oil is too thin. In this case it is sufficient to add a polymeric compound as thickening agent, i.e. a polymer which produces a substantially uniform relative thickening effect over a relatively wide temperature range.

Internal combustion engines are to a greater or lesser extent subject to fouling. The combustion gases leaking along the piston wall contain active organic compounds such as acids, aldehydes and ketones, giving rise to the formation of lacquer-like deposits on the cylinder and piston walls. If these deposits find their way into the lubricating oil they can cause the formation of polymerization, condensation and oxidation products which are partly insoluble in the lubricating oil, so that fouling, viscosity change and deterioration of lubricating properties may occur. Moreover, the presence of acid combustion products can cause corrosive wear. To prevent or counteract these effects the use of appropriate lubricant additives is essential. In the past a wide variety of polymers containing polar groups have been proposed for this purpose.

Among the polymers proposed so far as lubricating oil additives are both mono-functional additives, (additives which are capable of bringing about one of the favorable effects described above) and multi-functional additives, (additives which are capable of improving a lubricating oil in several respects simultaneously. The last-mentioned group of additives includes a class of polymers which may be regarded as tri-functional additives, because they not only display activity as a dispersant and VI-improver or thickener but also are capable of depressing the pour point of a lubricating oil to which they are added. The additives concerned are copolymers of one or more alkyl esters of aliphatic carboxylic acids and one or more aliphatic esters of unsaturated monocarboxylic acids which esters contain at least one free hydroxyl group in the part of the molecule derived from the alcohol.

SUMMARY OF THE INVENTION

It has now been found that the properties of copolymers of this type can be improved in a number of respects by using one or more compounds comprising a single polymerizable C=C group and at least one aromatic ring as comonomer in the preparation of these copolymers.

The invention therefore specifically relates to copolymers of one or more compounds comprising a single polymerizable C=C group and at least one aromatic ring, one or more alkyl esters of unsaturated aliphatic carboxylic acids and one or more aliphatic esters of unsaturated monocarboxylic acids which esters contain at least one free hydroxyl group in the part of the molecule derived from the alcohol; the molecular weight of the copolymers is from 100,000 to 2,500,000. These copolymers are novel compounds. The invention also relates to lubricant compositions containing the novel copolymers.

For the sake of brevity, compounds comprising a single polymerizable C=C group and at least one aromatic ring will hereinafter be designated as aromatic monomers.

The aromatic rings of which at least one must be present in the aromatic monomers may be either carbocyclic (for instance a benzene ring) or heterocyclic (for instance a pyridine ring).

The aromatic monomers suitable for use as comonomers in the preparation of the copolymers under consideration have from 8 to about 30 carbon atoms, and on the basis of their structure, can be grouped in two classes:

(I) Aromatic monomers in which at least one of the carbon atoms of the polymerizable C=C group is directly linked to a carbon atom of an aromatic ring. Examples of aromatic monomers of this type are vinylbenzene, 2-vinylpyridine, 2-methyl-5-vinylpyridine, vinylbenzenes in which one or more of the hydrogen atoms of the benzene ring have been replaced by chlorine atoms, vinyltoluene, alkyl esters of cinnamic acid and vinylnaphthalene. Especially suitable are vinyl-substituted aromatic hydrocarbons and particularly vinyltoluene.

(II) Aromatic monomers in which neither of the two carbon atoms of the polymerizable C=C group is directly linked to a carbon atom of an aromatic ring.

Examples of suitable aromatic monomers of this type are esters of unsaturated aliphatic monocarboxylic acids which contain a benzene ring in the part of the molecule derived from the alcohol such as phenoxyethyl methacrylate, phenyl methacrylate and benzyl methacrylate as well as the corresponding acrylate esters, particularly benzyl methacrylate and phenoxyethyl methacrylate.

When the copolymers under consideration are used as additives in a lubricating oil, it is desirable that an optimum interaction take place between the aromatic part of the copolymers and the oil. If the aromatic monomers contain substituents that contribute to the solubiliy of the homopolymer in the oil, such as, for instance, large alkyl substituents, then the interaction between the copolymers and the oil is impaired by steric hindrance. In view of this, preferred aromatic monomers are those of which the homopolymer is oil-insoluble.

The improvements that can be obtained by using an aromatic monomer as comonomer in the preparation of the copolymers according to the invention are dependent on the structure of the aromatic monomer.

The improvements obtained by employing an aromatic monomer from class I can be summarized as follows. When copolymers according to the invention, prepared from an aromatic monomer of class I are compared with similar copolymers which, however, have been prepared without an aromatic monomer, then it is found that:

(1) Copolymers according to the invention possess a considerably higher thermal stability. This property is of importance in those cases where the copolymers are exposed to high temperatures, as happens for instance, when the copolymers are employed as additives in lubricants for internal combustion engines. When the copolymers have a higher thermal stability, they less readily decompose at high tmeperatures, and their favorable effect in lubricants is maintained for a longer period.

(2) Copolymers according to the invention possess a considerably higher shear stability. Therefore, engine lubricating oils in which they are included as additives will show a smaller decrease in viscosity upon use.

(3) Copolymers according to the invention possess a considerably higher thickening power when present in lubricating oils prepared by a severe hydrotreating process. This implies that the quantity of additive required in these lubricating oils to reach a certain viscosity at a high temperature is considerably smaller when use is made of copolymers according to the invention.

When an aromatic monomer from class II is used, the improvement obtained can be described as follows:

Copolymers containing free hydroxyl groups exert a stabilizing influence on emulsions that may occur in lubricating oils. This influence can be decreased by diminishing the hydroxyl content of the copolymer. A strong decrease in the hydroxyl content, however, results in the VT of the copolymers being lowered. When copolymers according to the invention, prepared with an aromatic monomer from class II, are compared with similar copolymers prepared without an aromatic monomer, it is found that with copolymers according to the invention the hydroxyl content can be reduced far more without the VT of the copolymers diminishing in consequence thereof.

In principle the present copolymers can be prepared by two routes. It is possible to prepare these copolymers directly by copolymerization of a mixture of monomers consisting of one or more aromatic monomers, one or more alkyl esters of unsaturated aliphatic carboxylic acids, which esters contain at least one free hydroxyl group in the part of the molecule derived from the alcohol. The copolymers are preferably prepared via an indirect route by copolymerization of a mixture of monomers consisting of one or more aromatic monomers, one or more alkyl esters of unsaturated aliphatic carboxylic acids and one or more unsaturated aliphatic monocarboxylic acids, and after-treatment of the acid copolymers so obtained, in which the free carboxyl groups are converted to —COOR groups, in which R represents a monovalent aliphatic radical containing at least on free hydroxyl group.

The alkyl esters of unsaturated aliphatic carboxylic acids which can be used as monomers in the preparation of the present copolymers may be either alkyl esters of unsaturated aliphatic monocarboxylic or polycarboxylic acids having from 2 to about 40 carbon atoms per alkyl group. Also suitable for this purpose are mixtures of alkyl esters of unsaturated aliphatic carboxylic acids. Examples of suitable alkyl esters of unsaturated aliphatic monocarboxylic acids are: methyl methacrylate, isobutyl acrylate, lauryl methacrylate and stearyl methacrylate. Examples of suitable alkyl esters of unsaturated aliphatic polycarboxylic acids are: diethyl maleate, dioctyl fumarate and di(2-ethylhexyl) itaconate. Preferred are copolymers prepared from alkyl esters of unsaturated aliphatic monocarboxylic acids of which at least 25% w. have from 8 to about 20 carbon atoms in the alkyl group, particularly preferred is a mixture of lauryl methacrylate and stearyl methacrylate.

The preparation of the copolymers of the invention can be started from a mixture of alkyl esters of unsaturated aliphatic carboxylic acid at least a part of which consists of alkyl esters derived from alcohols obtained by a special hydroformylation process. The alcohols in question are prepared by reacting olefins with carbon monoxide and hydrogen in the presence of a complex which contains in the molecule a transition metal with an atomic number of 23 to 85 and at least one molecule of a biphyllic ligand which contains trivalent phosphorus, arsine or antimony as catalyst. In this context a biphyllic ligand is understood to mean a compound containing an element with an electron pair which is capable of forming a coordination bond with a metal atom and which element is at the same time capable of accepting electrons from the metal, as a result of which the stability of the complex is increased. Excellent results can be obtained by using a complex which contains cobalt, carbon monoxide and one or more phosphorus compounds. Starting from olefins, the above-mentioned process permits a simple, one-stage preparation of alcohols which are predominantly unbranched, by hydroformylation at a relatively low pressure.

Suitable aliphatic esters of unsaturated monocarboxylic acids preferably have from 5 to about 30 carbon atoms in the alkyl group. Examples of aliphatic esters of unsaturated monocarboxylic acids which esters contain at least one free hydroxyl group in the part of the molecule derived from the alcohol are partial esters of polyhydric aliphatic alcohols such as glycol, glycerol, trimethylolpropane and pentaerythritol with unsaturated aliphatic monocarboxylic acids such as acrylic acid and methacrylic acid, a part of the hydroxyl groups originally present in the polyvalent alcohols occurring as such in the said partial esters. Examples of such esters further include reaction products of cyclic ethers which in addition to an oxygen atom contain two or three carbon atoms in the ring such as ethylene oxide and trimethylene oxide with unsaturated aliphatic monocarboxylic acids such as acrylic acid and methacrylic acid, which reaction products contain a free hydroxyl group in the part of the molecule derived from the cyclic ether.

Preferred are copolymers that may be regarded as being derived from monohydroxyalkyl esters of unsaturated aliphatic monocarboxylic acids, particularly from β-hydroxyethyl methacrylate.

When the preparation of the present copolymers is effected via an indirect route, by copolymerization of a mixture of monomers consisting of one or more aromatic monomers, one or more alkyl esters of unsaturated aliphatic carboxylic acids and one or more unsaturated aliphatic monocarboxylic acids, and by after-treatment of the acid copolymers thus obtained, methacrylic acid is preferred as the unsaturated monocarboxylic acid.

The after-treatment of the copolymers with free carboxyl groups, in which these groups are converted into —COOR groups, wherein R represents a monovalent aliphatic radical having at least one free hydroxyl group and from about 2 to 18 carbon atoms, can be carried out in various ways.

It is possible, for example, to react the copolymers having free carboxyl groups with polyhydric aliphatic alcohols such as glycol, glycerol, trimethylolpropane or pentaerythritol. The after-treatment is preferably carried out by reacting the copolymers having free carboxyl groups with cyclic ethers which in addition to an oxygen atom contain two or three carbon atoms in the ring, such as ethylene oxide and trimethylene oxide, in particular ethylene oxide.

The molecular weight of the copolymers under consideration may vary in wide limits. Generally, copolymers are prepared with a molecular weight MW between 100,000 and 2,500,000, and in particular copolymers with a molecular weight MW between 200,000 and 1,250,000. It has been found that in addition to the presence of an aromatic monomer selected from class I, the molecular weight of the copolymers also has an important influence on their resistance against shear. Copolymers according to the invention have a high shear stability particularly if their molecular weight MW lies below 750,000.

When the copolymers according to the invention are copolymers of one or more aromatic monomers, one or more alkyl esters of unsaturated aliphatic monocarboxylic acids and one or more monohydroxyalkyl esters of unsaturated aliphatic monocarboxylic acids, then preferred are copolymers in which the average number of carbon atoms of the groups $CH_3-(CH_2)_n-$ present in the alkyl side chains originating from the alkyl esters, $n$ being at least 9, is 12.5 to 14.3. It has been found that the pour point depressing power of these copolymers in lubricating oil is considerably higher than that of similar copolymers according to the invention in which the average number of carbon atoms of the groups $CH_3-(CH)_{2n}-$ present in the alkyl side chains originating from the alkyl esters, $n$ being at least 9, is less than 12.5 or more than 14.3. Particularly preferred are copolymers of this type in which the average number of carbon atoms in the groups

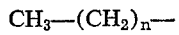

present in the alkyl side chains originating from the alkyl esters, $n$ being at least 9, is from 13.0 to 14.1. The alkyl esters of unsaturated aliphatic monocarboxylic acids that can be used as monomers in the preparation of such copolymers according to the invention should consist, at least in part, of alkyl esters whose alkyl chain contains a group $CH_3-(CH_2)_n-$, $n$ being at least 9. In addition, the last-mentioned alkyl esters must possess such a chain length, and must be present in the monomer mixture in such relative amounts that the average number of carbon atoms of the $CH_3-(CH_2)_n$ groups present in the alkyl chains, $n$ being at least 9, is from 12.5 to 14.3. Examples of such monomers are alkyl esters of unsaturated aliphatic monocarboxylic acids in which an unbranched alkyl chain is present containing at least 10 carbon atoms, such as n-decyl esters, n-dodecyl esters, n-tetradecyl esters, n-hexadecyl esters and n-octadecyl esters of unsaturated aliphatic monocarboxylic acids, as well as alkyl esters of unsaturated aliphatic monocarboxylic acids in which there is present a branched alkyl group, provided this branched alkyl group contains a $CH_3-(CH_2)_n$ group in which $n$ is at least 9. In addition to the above-mentioned alkyl esters, which must be present in the monomer mixture in order that a copolymer according to the invention can be prepared, the monomer mixture may contain other alkyl esters of unsaturated aliphatic monocarboxylic acids such as alkyl esters having less than ten carbon atoms in the alkyl chain or alkyl esters having ten or more carbon atoms in the alkyl chains wherein, however, a

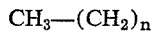

group in which $n$ is at least 9 is absent. Examples of such monomers are methyl esters, ethyl esters, n-butyl esters, isooctyl esters and 2-methyl decyl esters of unsaturated aliphatic monocarboxylic acids.

In the copolymers according to the invention the molar ratio of the units originating from the alkyl esters of unsaturated aliphatic carboxylic acids and the aliphatic esters of unsaturated monocarboxylic acids which esters contain at least one free hydroxyl group in the part of the molecule derived from the alcohol, may vary in a wide range.

If the copolymers according to the invention are copolymers of one or more aromatic monomers, one or more alkyl esters of unsaturated aliphatic monocarboxylic acids and one or more monohydroxyalkyl esters of unsaturated aliphatic monocarboxylic acids, then the copolymers mostly contain 0.25–5 units originating from the monohydroxyalkyl esters to every 10 units originating from the alkyl esters. With a view also to the pourability of concentrates in lubricating oils of such copolymers, preference is given to copolymers of this type which contain less than 3 units originating from the monohydroxyalkyl esters to every 10 units originating from the alkyl esters. It has been found that the pourability of concentrates in lubricating oils of these copolymers is far better than that of concentrates in lubricating oil of similar copolymers according to the invention which, however, contain more than 3 units originating from the monohydroxyalkyl esters to every 10 units originating from the alkyl esters. Particularly preferred are copolymers which contain less than 2 units originating from the monohydroxyalkyl esters to every 10 units originating from the alkyl esters. By decreasing the polarity, the thickening power of the copolymers is increased, which implies that in order to reach a certain viscosity level with a certain amount of copolymer, a copolymer with a comparatively low polarity is used it is, also, possible to decrease the molecular weight of the copolymer. As stated hereinbefore, a decrease in the molecular weight of the copolymers according to the invention results in the shear stability being increased.

A large decrease in the concentration of polar groups in these copolymers may result in a decrease in the VT. However, this disadvantage can be overcome by employing copolymers that have been prepared with an aromatic monomer selected from class II as comonomer.

The copolymerization of aromatic monomers, alkyl esters of unsaturated aliphatic carboxylic acids and unsaturated aliphatic monocarboxylic acids is preferably carried out in solution in the preesnce of a radical initiator such as an azo compound or a peroxide. As is known, the relative proportions in which the monomers are incorporated in a growing copolymer molecule, are dependent on the reactivity of the monomers involved. If these reactivities differ, the molar ratio of the monomers in the mixture to be polymerized will change considerably as the copolymerization proceeds, since the more reactive monomer is incorporated more rapidly. Therefore, the composition of the copolymer will also change continually. Generally it may be stated that if no special measures are taken in the copolymerization of monomers that differ widely in respectivity, the products will have an extremely heterogeneous composition. A case in point is in the copolymerization of aromatic monomers, alkyl esters of unsaturated aliphatic carboxylic acids and unsaturated aliphatic monocarboxylic acids in which, depending on the nature of the aromatic monomer, one is concerned with two or three types of monomers which differ in reactivity. With respect to the copolymerization of unsaturated aliphatic monocarboxylic acids with alkyl esters of unsaturated aliphatic carboxylic acids it has been found that the rates of incorporation of these monomers can be equalized by carrying out the copolymerization in the presence of a substance that associates with the unsaturated aliphatic monocarboxylic acid. As a result of the equality of the rates of incorporation of the monomers the molar ratio of the incorporated monomers becomes the same as that of the monomers in the starting mixture. Suitable associating substances are, inter alia, aliphatic compounds containing an oxygen atom linked to carbon, such as alcohols, ethers, ketones and carboxylic acids. Preference is given to aliphatic alcohols such as methanol, ethanol, isopropanol and one may use tert-butanol, particular preference being given to methanol, a solvent in which the copolymerizations are performed. For instance, one may use an aromatic hydrocarbon in which polymerizable C=C groups do not occur, such as benzene, toluene or xylene, particularly toluene.

In the preparation of copolymers of aromatic monomers, alkyl esters of unsaturated aliphatic carboxylic acids and unsaturated aliphatic monocarboxylic acids in the presence of the above-mentioned associating substances the number of monomers differing in reactivity is in principle reduced by one, since the unsaturated aliphatic monocarboxylic acids and the alkyl esters of unsaturated aliphatic carboxylic acids in the copolymerization with aromatic monomers behave like monomers of the same reactivity.

With respect to the reactivity of the aromatic monomers two cases are significant:

(1) There is no significant difference between the reactivity of the aromatic monomers and that of the alkyl esters of unsaturated aliphatic carboxylic acids; this case occurs when, for instance, vinyltoluene, benzyl methacrylate or phenoxyethyl methacrylate is used as the comonomer.

(2) The aromatic monomers possess a lower or a higher reactivity than the alkyl esters of unsaturated aliphatic carboxylic acids; this occurs when, for instance, styrene, respectively meta- or para-halogen styrenes are used as the comonomer.

When use is made of aromatic monomers as mentioned under (1), it is possible to prepare copolymers, according to the invention, of a constant average composition without taking special measures.

When aromatic monomers as mentioned under (2) are used, the monomers in the mixture to be polymerized differ in reactivity, it is nevertheless still possible to prepare copolymers of a constant average composition, if care is taken that the ratio between the concentrations of the monomers in the mixture to be polymerized remains substantially unchanged during the copolymerization. For instance, the more reactive monomer or a mixture of monomers rich in the more reactive monomer is added, gradually during the polymerization, to the mixture. This method is known as programmed copolymerization. It is also possible to stop the polymerization after only a minor amount of the most reactive monomer present in the mixture to be polymerized has been converted to terpolymer. The polymerization time depends on the concentration and the difference in reactivity of the monomers and the desired degree of homogeneity of the terpolymer. This is called copolymerization to a low conversion. The polymerizations can be carried out either batchwise or continuously. The continuous polymerizations can take place in a tubular reactor or by continuously adding all reaction components—in the ratio in which they are consumed in the process—to a reaction mixture whose composition is kept homogeneous, for instance by intense stirring, with simultaneous discharge of part of the reaction mixture.

The polymerization of aromatic monomers, alkyl esters of unsaturated aliphatic carboxylic acids and unsaturated aliphatic monocarboxylic acids generally proceeds rapidly until a conversion of approximately 90% is reached. Further polymerization, however, up to a conversion of 95–100%, is rather time-consuming. It has been found that the polymerization can be considerably accelerated if during the polymerization, after a conversion of approximately 90% has been reached, an additional quantity of initiator varying from 10–100% by weight based on the quantity of initiator used at the beginning of the polymerization, is added to the reaction mixture.

The after-treatment of the acid copolymers with a cyclic ether can take place in the presence of a basic reacting substance as a catalyst. Suitable basic reacting substances are, for instance, alkali metals, alkaline earth metals, alkaline earth metal oxides, alkaline earth metal hydroxides and organic compounds such as tri-methylamine, N-methylmorpholine, pyridine, quinoline and β-picoline. Preferably a lithium compound is used as catalyst. Examples of suitable lithium compounds are, inter alia, lithium hydroxide, lithium hydride, lithium alkoxides, lithium carbonate and lithium acetate. Excellent results can be obtained by using lithium hydroxide as catalyst.

A variant of the after-treatment described above is one in which the reaction of the acid copolymer with the cyclic ether is, contrary to the usual practice, not carried out in the presence of a basic reacting substance as a catalyst, but in which this catalyst is incorporated previously in the acid copolymer. The incorporation of the catalyst in the acid copolymer can be effected by including in the monomer mixture from which the acid copolymer is prepared one or more salts of basic reacting substances and unsaturated aliphatic carboxylic acids. The acid copolymer obtained by polymerization of this monomer mixture can subsequently be reacted with a cyclic ether without using any additional catalyst. Here preference is also given to lithium compounds as catalysts.

The reaction of the acid copolymer with the cyclic ether can be carried out at room temperature, but is preferably performed at elevated temperature, for instance at a temperature between 95 and 130° C. If the final produce is liquid, then the reaction can take place without a solvent. If a solvent is used this may be either a polar solvent or a non-polar solvent. The copolymer having free carboxyl groups shows a tendency, especially in a non-polar solvent, to form intermolecular hydrogen bonds, thereby greatly increasing the viscosity. Therefore, the reaction wtih the cyclic ether is preferably carried out in the presence of a polar substance which inhibits the formation of intermolecular hydrogen bonds. Suitable for this purpose is a low-boiling aliphatic alcohol. A highly suitable medium for carrying out the reaction is a mixture of a low-boiling aliphatic alcohol and an aromatic hydrocarbon in which polymerizable C=C groups do not occur.

In the preparation of the present copolymers by copolymerization to acid copolymers followed by after-treatment with a cyclic ether it is not necessary to isolate the acid copolymers before reacting these with the cyclic ether. The cyclic ether may be added directly to the reaction mixture obtained in the copolymerization. If in the preparation of the acid copolymer an alcohol is used as an associating substance, then this one-stage process offers the additional advantage that the alcohol present in the reaction mixture also inhibits the formation of intermolecular hydrogen bonds in the acid copolymer.

If the copolymers are prepared from an aromatic monomer selected from class I, then, as stated hereinbefore, favorable results can be obtained by using these copolymers in lubricating oils prepared by a process comprising severe hydrotreating.

Severe hydrotreating of lubricating oil base materials is a treatment with hydrogen at elevated temperature and pressure in the presence of a functional catalyst comprising a metal-containing hydrogenating component on a carrier possessing cracking activity, with the object of, inter alia, increasing the viscosity index of the base material. Examples of lubricating oil base materials which may be subjected to severe hydrotreating are deasphalted residual lubricating oil and heavy distillate lubricating oil base materials which have been subjected to a treatment aimed at diminishing the concentration of aromatics, such as a furfural extraction treatment.

Suitable reaction conditions at which the severe hydrotreating of lubricating oil base materials can be carried out are: a temperature of from about 250 to 550° C., a pressure of from about 70 to 350 kg./cm.$^2$, a space velocity of from 0.1 to 10 parts by volume of lubricating oil base material per volume part of catalyst per hour and a hydrogen supply rate of from 150 to 5000 Nl hydrogen per kg. lubricating oil base material.

Examples of suitable catalysts which may be used in the severe hydrotreating are catalysts in which the metal-containing hydrogenating components are metals of Group VI or Group VIII or oxides or sulfides or mixtures thereof and in which the carrier consists of one or more refractory metal oxides. Particularly suitable catalysts are combinations of nickel and molybdenum or of cobalt and molybdenum which have been converted into a composite material with carriers such as aluminum oxide or silicium oxide/aluminum oxide.

Depending on the chosen reaction conditions the severe hydrotreating of lubricating oil base materials as described hereinbefore can in some cases also be termed hydrocracking.

The lubricants in which the copolymers can be incorporated can be mineral lubricating oils of varying viscosity, synthetic lubricating oils or lubricating oils containing fatty oils. The copolymers can also be incorporated in greases. The copolymers are of special importance for the improvement of mineral lubricating oils or mixtures thereof. The copolymers can be added to the lubricant as such or in the form of a concentrate obtained for instance by mixing the polymers with a minor amount of oil. The concentration of the present copolymers may vary within wide limits, for instance from 0.1 to 10% by weight and preferably from 0.5 to 5% by weight.

In addition to the present copolymers the lubricant compositions may also contain other additives such as antioxidants, anticorrosive agents, antifoaming agents, means for improving the lubricant action and other substances which are generally added to lubricants.

The following examples will serve to illustrate the invention.

EXAMPLE

Thirteen copolymers (copolymers 1-13) were prepared according to the invention by the copolymerization of lauryl methacrylate, stearyl methacrylate, methacrylic acid and an aromatic monomer followed by ethoxylation of the acid copolymers. For comparison, two related copolymers (copolymers A and B) were also prepared, by copolymerization of lauryl methacrylate, stearyl methacrylate and methacrylic acid, followed by ethoxylation of the acid copolymers. The copolymers A and B were not prepared according to the invention; these copolymers were prepared without an aromatic monomer as comonomer in the polymerization. For illustrative purposes the preparation of copolymer 9 is described below. The preparation of the other copolymers proceeded along the same lines.

PREPARATION OF COPOLYMER 9

42.5 percent by weight of a mixture of lauryl methacrylate, stearyl methacrylate, methacrylic acid and an aromatic monomer in the ratio desired in the ultimate copolymer, was mixed with 14 percent by weight of methanol, 43.5 percent by weight of toluene and 0.175 percent by weight of benzoyl peroxide. The mixture was heated to 73° C. and the polymerization was carried out with the exclusion of oxygen. Subsequently added to the reaction mixture were 0.04 percent by weight of lithium hydroxide and 2 moles of ethylene oxide per equivalent of acid present in the acid copolymers. The temperature was increased to 110° C. and the ethoxylation carried for 24 hours. A sufficient quantity of a thin mineral lubricating oil was subsequently added to the reaction mixture so that after removal of methanol and toluene in a film evaporator a 30%-concentrate of the desired copolymer in the oil was obtained. The molar composition of the various copolymers is given in Table I.

TABLE I

| Copolymer No. | Molar compositions of the copolymers | | | | | |
|---|---|---|---|---|---|---|
| | Lauryl-methacrylate | Stearyl methacrylate | Hydroxyethyl methacrylate | Vinyl-toluene | Fenoxyethyl methacrylate | Benzyl methacrylate |
| A | 7 | 3 | 0.9 | | | |
| B | 7 | 3 | 1.8 | | | |
| 1 | 7 | 3 | 0.9 | 1 | | |
| 2 | 7 | 3 | 0.9 | 4.7 | | |
| 3 | 7 | 3 | 1.8 | 1.1 | | |
| 4 | 7 | 3 | 1.8 | 2.7 | | |
| 5 | 7 | 3 | 1.8 | 5.1 | | |
| 6 | 7 | 3 | 2.7 | 1.15 | | |
| 7 | 7 | 3 | 2.7 | 5.5 | | |
| 8 | 7 | 3 | 3.5 | 5.8 | | |
| 9 | 7 | 3 | 0.9 | 2.5 | | |
| 10 | 7 | 3 | 0.9 | 1.5 | | |
| 11 | 7 | 3 | 0.9 | | 3.5 | |
| 12 | 7 | 3 | 1.8 | | 0.9 | |
| 13 | 7 | 3 | 0.9 | | | 2.7 |

The influence of the present copolymers on the viscometric properties and the pour point of a lubricating oil was determined by incorporating the copylmers in a distillate lubricating oil in a concentration of 1.5 percent by weight. The pour point was determined by ASTM method D/97. The results are given in Table II.

TABLE II

| Composition of the oil | $V_k$ 100° F., cs. | $V_k$ 210° F., cs. | VI | VT | Pour point, °C |
|---|---|---|---|---|---|
| Base oil | 57.8 | 7.4 | 96 | | −10 |
| Base oil plus 1.5% by weight of copolymer: | | | | | |
| A | 73.6 | 12.8 | 186 | 126 | |
| 1 | 75.6 | 10.0 | 125 | 117 | −30 |
| 2 | 74.2 | 9.5 | 116 | 102 | −27 |
| 3 | 71.2 | 9.8 | 129 | 140 | |
| 4 | 69.8 | 9.5 | 125 | 136 | |
| 5 | 71.5 | 9.3 | 117 | 111 | −25 |
| 6 | 67.7 | 9.2 | 124 | 148 | |
| 7 | 68.2 | 9.1 | 119. | 130 | |
| 8 | 66.3 | 8.9 | 119. | 144 | −25 |
| 11 | 68.9 | 9.8 | 135 | 170 | |
| 12 | 67.8 | 9.3 | 126 | 153 | −30 |
| 13 | 76.2 | 11.1 | 146 | 146 | |

NOTE.—VI=viscosity index;

$$VT = \frac{\text{Specific viscosity at } 210° \text{ F.}}{\text{Specific viscosity at } 100° \text{ F.}} \times 100$$

$$\text{Specific viscosity} = \frac{\text{viscosity (base oil plus polymer)} - \text{viscosity of base oil}}{\text{Viscosity of base oil}}$$

The thermal stabilities of the present copolymers are listed in Table III. They were determined in vacuum at a rate of heating of 3° C. per minute. The value $T_{10}$ is the temperature at which a 10 percent loss in weight of the copolymer is reached.

In order to investigate the behaviour of the present copolymers as dispersants, they were subjected to a peptization test. In this test the lowest concentration of additive is determined which is capable of keeping 0.015 percent by weight of carbonaceous material in mineral oil in suspension for 15 minutes at a temperature of 20° C. The results of these peptization tests are likewise listed in Table III.

TABLE III

| Copolymer No. | $T_{10}$, °C. | Peptization test, percent, by weight |
|---|---|---|
| A | 230 | 0.003–0.005 |
| 1 | 270 | 0.003–0.005 |
| 2 | 285 | |
| 3 | 270 | |
| 4 | 275 | 0.002 |
| 5 | 285 | |
| 6 | 270 | |
| 7 | 285 | 0.001–0.003 |
| 8 | 285 | |
| 12 | | 0.001–0.003 |

The results of the peptization tests (all <0.005 percent by weight) are quite favorable.

A heavy lubricating oil base material prepared from a crude oil from the Middle East was processed in two different ways:

(1) Aromatics extraction with furfural followed by dewaxing with a mixture of methyl ethyl ketone and toluene yielded a conventional lubricating oil with the following properties:

$V_k 0°$ F.$=63$P
$V_k 210°$ F.$=9.3$ cs.
VI$=95$.

(2) Aromatics extraction with furfural, severe hydrotreating and dewaxing with a mixture of methyl ethyl ketone and toluene yielded a hydro-processed lubricating oil with the following properties:

$V_k 0°$ F.$=63$P
$V_k 210°$ F.$=12.6$ cs.
VI$=120$.

When a comparison is made between the viscometric properties of the two oils it is found that at a low temperature they have the same viscosity; at a high temperature, however, the hydroprocessed lubricating oil has a much higher viscosity. In view of this it may be expected that the quantity of thickener required to reach a certain viscosity at a high temperature (for instance $V_k 210°$ C.$=19.3$ cs.) is much smaller for the hydroprocessed oil than for the conventional oil.

It has been found that in order to reach a $V_k 210°$ F.$=19.3$ cs.

an amount of 3.4 percent by weight of copolymer B has to be added to the conventional oil. Thus, one would expect that in order to reach this $V_k 210°$ F. in the hydroprocessed oil, an amount of only $$\frac{19.3-12.6}{19.3-9.3} \times 3.4 = 2.3 \text{ percent}$$

by weight of copolymer B is required, which constitutes a saving of polymer of 33%. However, it has been found experimentally that the amount of copolymer B that has to be added to the hydroprocessed oil to reach a $V_k 210°$ F.$=19.3$ cs.

is 2.6 percent by weight, so that the saving of polymer is only 27%.

From Table IV it appears that by use of the instant copolymers prepared with an aromatic monomer from Class I as comonomer the calculated saving of polymer in hydroprocessed oils is obtained experimentally as well.

TABLE IV

| Copolymer | Calculated saving of polymer in the hydroprocessed oil, percent | Experimentally found saving of polymer in the hydroprocessed oil, percent |
|---|---|---|
| B | 33 | 27 |
| 9 | 41 | 41 |
| 2 | 62 | 62 |

NOTE.—The saving depends on the molecular weight of the copolymer.

The influence of aromatic monomers of Class II on the VT of the present copolymers can readily be perceived when a comparison is made between the VT values for the copolymers A and 11 in Table II.

In order to ascertain how far the present copolymers show a tendency to stabilize emulsions in lubricating oil, they were subjected to an emulsion test. In this test 80 ml. of water is thoroughly mixed with 20 ml. lubricating oil to which 1.5 percent by weight of copolymer has been added. The emulsion thus formed is examined for stability. Compared was the volume ratio emulsion+oil/original amount of oil. Thus the emulsion rating in this test may vary from 100/20 (completely emulsified) to 20/20 (no emulsion).

Some emulsion ratings are listed in Table V.

TABLE V

| Copolymer No.: | Emulsion rating |
|---|---|
| B | 2.7 |
| 2 | 1.4 |
| 11 | 2.0 |
| - | 1.0 |

The shear stability of the present copolymers was determined in the diesel injector pump test, the copolymers were incorporated in a concentration of 2 percent by weight in the aforementioned hydroprocessed lubricating oil with $V_k$ 210° F.$=12.6$ cs. to which had been added 8 percent by weight of a commercial additive package with detergent, antirust, antioxidant and EP action. The oils thus obtained were passed twenty times through the diesel injector pump while being subjected to high shearing forces and shearing rates (higher than $10^6$ s.$^{-1}$) by causing the oil to expand at 25° C. from 160 atm. to 1 atm. via a narrow injector. From the difference in $V_k$ 210° F. before and after the test the percentage loss in thickening power of the copolymers can be calculated. The result of the tests is shown in Table VI.

TABLE VI

| Copolymer No. | $V_k$ 210° F. Before shear, cs. | $V_k$ 210° F. After shear, cs. | Loss in thickening power of the copolymer, percent |
|---|---|---|---|
| B | 18.4 | 15.1 | 57 |
| 9 | 17.6 | 16.7 | 18 |
| 10 | 20.6 | 17.2 | 43 |

The diesel injector pump used for these shear tests is known as "Apparat zur Bestimmung der Scherfestigkeit von Mineralölen" and is manufactured and marked by Kurt Orbahn in Hamburg.

From the foregoing it is evident that the copolymers of the present invention impart excellent viscosity index characteristics, dispersancy and pour point properties to lubricating oils.

We claim as our invention:

1. A lubricant composition consisting essentially of a major amount of a lubricating oil and from 0.1 to 10% by weight of a copolymer of (a) vinyltoluene, (b) a mixture of lauryl and stearyl methacrylate, and (c) beta-hydroxyethyl methacrylate, where in said copolymer the molar ratio of the units derived from (b) to those derived from (c) is 10 to 0.25–5 and the molar ratio of the units derived from (b) to those derived form (a) is 10 to 1–5.8, and the molecular weight MW of said copolymer is from 100,000 to 2,500,000.

2. The composition of claim 1 wherein the copolymer is present in an amount from 0.5 to 5% by weight.

3. The composition of claim 1 wherein the molecular weight MW of the copolymer is from 200,000 to 1,250,000.

4. The composition of claim 1 wherein the lubricating oil is a mineral lubricating oil.

References Cited

UNITED STATES PATENTS

| | | | |
|---|---|---|---|
| 2,655,479 | 10/1953 | Munday et al. | 252—56 |
| 2,892,819 | 6/1959 | Stewart et al. | 252—56 |
| 3,198,739 | 8/1965 | Richards et al. | 252—56 |
| 3,244,631 | 4/1966 | Vander Voort | 252—56 |
| 3,285,887 | 11/1966 | De Vries | 252—56 X |
| 3,296,164 | 1/1967 | Koch et al. | 252—56 X |
| 3,304,260 | 2/1967 | Fields et al. | 252—56 X |
| 3,313,733 | 4/1967 | De Vries | 252—57 |

DANIEL E. WYMAN, Primary Examiner

W. H. CANNON, Assistant Examiner

U.S. Cl. X.R.

252—56 R, 56S, 51.5 A; 260—80.75